United States Patent [19]

Hinkamp et al.

[11] 3,879,454

[45] Apr. 22, 1975

[54] PREPARATION OF ALKYLPHOSPHONOTHIOIC DIHALIDES

[75] Inventors: James B. Hinkamp, Birmingham; Vincent F. Hnizda, Huntington Woods, both of Mich.

[73] Assignee: Ethyl Corporation, Richmond, Va.

[22] Filed: Sept. 8, 1967

[21] Appl. No.: 666,507

[52] U.S. Cl. .............................................. 260/543 P
[51] Int. Cl. .............................................. C07f 9/42
[58] Field of Search ................................ 260/543 P

[56] References Cited
UNITED STATES PATENTS

| | | | |
|---|---|---|---|
| 2,591,782 | 4/1952 | Cook | 23/14 |
| 3,149,137 | 9/1964 | Huffman | 260/448 |
| 3,518,303 | 6/1970 | Maier | 260/543 |

OTHER PUBLICATIONS

Oknobystin et al., Academy of Sciences, USSR (1958) p. 977–979 (Eng. Translation).

Karavanov et al., Chemical Abstract, Vol. 63 (8-1-6-65) p. 4327.

*Primary Examiner*—Lorraine A. Weinberger
*Assistant Examiner*—Paul J. Killos
*Attorney, Agent, or Firm*—Donald L. Johnson; Robert A. Linn

[57] ABSTRACT

Alkylphosphonothioic dihalides are prepared in improved yields by reacting a trialkyl aluminum with a thiophosphoryl halide in the absence of a hydrocarbon solvent. The reaction need not be carried out with pure thiophosphoryl halide. Instead, the thiophosphoryl halide can be in the mixture produced by reacting phosphorus trihalide and sulfur with an aluminum trihalide catalyst.

5 Claims, No Drawings

PREPARATION OF ALKYLPHOSPHONOTHIOIC DIHALIDES

BACKGROUND OF THE INVENTION

The preparation of alkylphosphonothioic dihalides in low yield has been described in German Patent No. 1,235,911. A need exists for an improved method which affords higher yields of product. This invention satisfies that need.

Thiophosphoryl halides used as starting materials are also old compounds and they have been described with methods for their preparation. In this regard, reference is made to U.S. Pat. Nos. 2,591,782, 2,715,561, 2,802,717, 2,850,353, 2,850,354, 2,911,281, and 2,915,361. The aforementioned Cook patent, U.S. Pat. No. 2,591,782, discloses a preparation of thiophosphoryl chloride from sulfur, phosphorus trichloride and an aluminum halide catalyst.

The alkylphosphonothioic dihalides produced by the process of this invention are useful as chemical intermediates. One method of use has been described in U.S. Pat. No. 3,024,278.

SUMMARY OF THE INVENTION

In essence, this invention comprises the discovery that high yields of alkylphosphonothioic dihalides are obtained when a thiophosphoryl halide is reacted with a trialkyl aluminum in the substantial absence of a hydrocarbon solvent. The thiophosphoryl halide used can be present in the reaction mixture produced by making it from phosphorus trihalide and sulfur using an aluminum halide catalyst.

DESCRIPTION OF THE PREFERRED EMBODIMENTS

A preferred embodiment of this invention comprises a process for the preparation of a compound having the formula $RPSX_2$, said process comprising the reaction of a. a thiophosphoryl halide selected from $PSCl_3$ and $PSBr_3$, with b. an alkyl aluminum having the formula $R_3Al$, R being an alkyl radical having up to 6 carbon atoms;

said reaction being conducted in the substantial absence of a hydrocarbon solvent. Because of their availability, use of triethyl or trimethyl aluminum is preferred.

The preparation of alkylphosphonothioic dihalides by the process of this invention is readily carried out by simply admixing the reactants. To achieve good yields in a reasonable time, reaction temperatures within the range of from about 30° to about 150°C. are used. Preferably, temperatures of from 60° to 100°C. are employed. The reaction pressure is not critical. Subatmospheric or elevated pressures can be used if desired. The reaction is conveniently carried out under ambient pressure. Preferably, the process is conducted under nitrogen, or in the presence of a similar inert atmosphere.

The reaction time is not a truly independent variable but is dependent at least to some extent on the inherent reactivity of reactants and the reaction temperature. In general, higher temperatures usually result in shortened reaction times. As a rule, the reaction of a thiophosphoryl trichloride and alkyl aluminum (according to the process of this invention) is complete within a period of about 15 minutes to 18 hours. In many instances, reaction times of about one to six hours are sufficient.

As stated above, the process of this invention is carried out in the substantial absence of a hydrocarbon solvent. By this, it is meant that the reaction is carried out by reacting the thiophosphoryl halide and the alkyl aluminum without adding any common hydrocarbon solvent to the reaction zone. Any minor amount of hydrocarbon solvent present as an impurity in the starting materials is not overly deleterious. In other words, it is not necessary to carefully purify the starting materials to remove any traces of hydrocarbon solvent. Thus, it is possible to use readily available forms of the reactants.

The stoichiometry of the reaction is not critical. In general, best results are achieved if a stoichiometric amount or a slight excess of the alkyl aluminum is employed. Thus, it is preferred that from about 1.0 to about 1.2 theories of alkyl aluminum be employed per each mole of thiophosphoryl halide. A "theory" is the amount (on a mole basis) of alkyl aluminum theoretically required to react with one mole of $PSX_3$ to produce an alkylphosphonothioic dihalide.

Although not bound by any theory, it is believed that the preparation of alkylphosphonothioic dihalides according to this invention proceeds according to the following equation:

$$3PSX_3 + R_3Al \rightarrow 2RPSX_2 + RPSX_2 \cdot AlX_3$$

The complexed alkylphosphonothioic dihalide is freed by various methods. One of these methods involves pouring the reaction mixture over ice. A preferred method comprises treating the reaction mixture with dioxane or an alkali metal halide such as sodium chloride. This treatment form uncomplexed alkylphosphonothioic chloride and an alkali metal aluminum tetrahalide such as $NaAlCl_4$. In general, an approximately stoichiometric quantity of alkali metal halide is used; 1.0 to 1.5 moles per mole of phosphonothioic halide complex being preferred. After the reaction mixture has been so treated, the product can be separated from the reaction mixture by distillation. Preferably, the distillation is carried out under reduced pressure, say 18 to 50 mm. Hg.

The following examples serve to illustrate the process of this invention but do not limit it. All parts are by weight.

EXAMPLE I

One and one-half moles (206 g) of $PCl_3$ and 0.15 moles (19.5 g) of $AlCl_3$ catalyst were charged to a nitrogen-flushed, 500 ml, stirred flask. The charge was heated to 60°. Then 1.5 moles (48.0 g) of sulfur were added incrementally in 15 minutes, converting the $PCl_3$ to $PSCl_3$. The reaction initiated immediately. Air cooling on the flask maintained the temperature between 58° and 67°C. during the addition.

Triethyl aluminum addition to the charge was begun at a mass temperature of 61°C. to ethylate $PSCl_3$ and thus form $EtP(S)Cl_2$. Again, the reaction initiated immediately. Sixty grams (1.05 theories) were fed to the charge dropwise in 37 minutes. Air cooling maintained the temperature at 80°–86°C. during the feed. Ground NaCl (37.8 g) was added to the charge to break the $EtP(S)Cl_2 \cdot AlCl_3$ complex by forming $NaAlCl_4$.

The product, $EtP(S)Cl_2$, was recovered by a simple distillation from the reactor over a 48 minute period.

The distillation was terminated at a maximum pot temperature of 150°C. and a minimum pressure of 6 mm Hg. The colorless distillate (228.1 g = 93.2% yield) analyzed 99.0 per cent pure by VPC. IR confirmed the structure of the product.

Similar results are obtained when the reaction of ethyl aluminum and PSCl₃ is carried out at 65° and 85°C.

Similar results are obtained when the phosphorus trichloride and sulfur are reacted at 20° and 75°C.

Similar results are obtained when the product is recovered by distillation at 18° and 25°C. and at a temperature of 145° to 190°C.

EXAMPLE II

The procedure of Example I was essentially repeated in a nitrogent-purged reaction vessel. The reaction of triethyl aluminum with PSCl₃ was conducted at 80°–90°C. The maximum liquid temperature when distilling the product was 190°C. The distillation pressure was 50 mm Hg.

The yield of product, $C_2H_5PSCl_2$, was 92 per cent. It analyzed 94.5 per cent pure.

Similar results are obtained when 1.0 and 1.5 theories of sodium chloride are used to disrupt the $C_2H_5PSCl_2 \cdot AlCl_3$ complex. Similar results are also obtained when the triethyl aluminum to PCl₃ ratio was, on a molar basis, 1.2 to 1 and 1.0 to 1.0.

EXAMPLE III

Various preparations essentially following the procedure of Example I are summarized in this example. The reactions are carried out under nitrogen.

Experiments a, b and c below are all conducted on the reaction mixture resulting from reacting one mole of PCl₃ and 1 grams atom of sulfur at 60°–65°C. using AlCl₃ as a catalyst. Likewise, the product, phosphonothioic dichloride, is recovered from the reaction mixture by distillation after freeing the resultant complex with NaCl at 25°C.

|     | Alkylating Agents | Product |
| --- | --- | --- |
| (a) | (CH₃)₃Al | CH₃PSCl₂ |
| (b) | (n-C₄H₉)₃Al | n-C₄H₉PSCl₂ |
| (c) | (n-C₆H₁₃)₃Al | n-C₆H₁₃PSCl₂ |

Experiments d, e, f and g are all conducted by reacting the alkylating agent listed below with the PSBr₃ in the reaction mixture produced by reacting PBR₃ and S at 100°C. using AlBr₃ as a catalyst. The complex RPSBr₂·AlBr₃ is disrupted by reacting the resultant reaction mixture after alkylation with NaCl at 30°C. Subsequently, the product is recovered by distillation.

|     | Alkylating Agent | Product |
| --- | --- | --- |
| (d) | (CH₃)₃Al | CH₃PSBr₂ |
| (e) | (iso-C₃H7)₃Al | iso-C₃H₇PSBr₂ |
| (f) | (sec-C₄H₉)₃Al | sec-C₄H₉PSBr₂ |
| (g) | (iso-C₆H₁₃)₃Al | iso-C₆H₁₃PSBr₂ |

In each instance above, yields are reduced if the reaction between the trialkyl aluminum and thiophosphoryl halide is conducted in the presence of added hydrocarbon solvent such as hexane, heptane, pentane, ligroin, and the like.

We claim:

1. A process for the preparation of a compound selected from the class consisting of $CH_3PSCl_2$ and $C_2H_5PSCl_2$, said process comprising
   a. preparing thiophosphoryl trichloride by reacting sulfur with phosphorus trichloride in the presence of a catalytic quantity of aluminum chloride at a temperature within the range of from about 20° to about 75°C., and
   b. reaction said thiophosphoryl trichloride in the thereby produced reaction mixture with an alkylating agent selected from trimethyl aluminum and triethyl aluminum at a reaction temperature of from about 60° to about 100°C., said process being conducted in the absence of added hydrocarbon solvent and with from about 1.0 to about 1.2 theories of said alkylating agent.

2. The process of claim 1 wherein Step (a) comprises the addition of said phosphorus trichloride to a mixture of said sulfur and aluminum chloride catalyst.

3. The process of claim 2 wherein said alkylating agent is trimethyl aluminum.

4. The process of claim 3 wherein said alkylating agent is triethyl aluminum.

5. The process of claim 4 being further characterized by the recovery of the ethyl phosphonothioic dichloride reaction product from the resultant reaction mixture by (i) treating said resultant reaction mixture with sodium chloride and (ii) thereafter distilling the resultant mass at a reduced pressure of from about 18 to about 25 mm Hg. and at a temperature of from about 145° to about 190°C.

* * * * *